(12) United States Patent
Ouyang et al.

(10) Patent No.: US 12,046,719 B2
(45) Date of Patent: Jul. 23, 2024

(54) BATTERY PACK, AND POWER CONSUMING DEVICE THEREOF

(71) Applicant: CONTEMPORARY AMPEREX TECHNOLOGY CO., LIMITED, Fujian (CN)

(72) Inventors: Shaocong Ouyang, Fujian (CN); Chenghua Fu, Fujian (CN); Baoyun Xu, Fujian (CN); Miaomiao Dong, Fujian (CN); Yonghuang Ye, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/118,756

(22) Filed: Mar. 8, 2023

(65) Prior Publication Data
US 2023/0231202 A1    Jul. 20, 2023

Related U.S. Application Data

(63) Continuation of application No. PCT/CN2021/131490, filed on Nov. 18, 2021.

(51) Int. Cl.
*H01M 10/0585* (2010.01)
*H01M 4/133* (2010.01)
(Continued)

(52) U.S. Cl.
CPC ....... *H01M 10/0585* (2013.01); *H01M 4/133* (2013.01); *H01M 10/441* (2013.01);
(Continued)

(58) Field of Classification Search
CPC .......... H01M 10/0585; H01M 10/441; H01M 50/204; H01M 2004/027; H01M 2004/028; H01M 2220/20
See application file for complete search history.

(56) References Cited

U.S. PATENT DOCUMENTS

| 9,960,458 | B2 | 5/2018 | Weicker et al. |
| 2003/0117105 | A1* | 6/2003 | Davis .................. H01M 10/441 320/107 |
| 2016/0380315 | A1 | 12/2016 | Weicker et al. |

FOREIGN PATENT DOCUMENTS

| CN | 112644334 A | 4/2021 |
| CN | 113594636 A | 11/2021 |

(Continued)

OTHER PUBLICATIONS

International Search Report and Written Opinion mailed on Aug. 1, 2022, received for PCT Application PCT/CN2021/131490, filed on Nov. 18, 2021, 16 pages including English Translation.

*Primary Examiner* — Osei K Amponsah
(74) *Attorney, Agent, or Firm* — XSENSUS LLP

(57) ABSTRACT

A battery pack may include a first battery cell type and a second battery cell type, wherein the first battery cell type may include n first battery cells, and the second battery cell type may include m second battery cells, with n and m being each independently selected from an integer of 1 or more, wherein the second battery cell may have a discharge power at $-20°$ C. greater than that of the first battery cell, the difference in discharge power at $-20°$ C. between the second battery cells and the first battery cells being $\geq 10$ W; the percentage by number of the first battery cells in the battery cells comprised in area A may be 20% to 100%, and the percentage by number of the second battery cells in the battery cells comprised in the area B may be 5% to 100%.

15 Claims, 2 Drawing Sheets

(51) Int. Cl.
*H01M 10/44* (2006.01)
*H01M 50/204* (2021.01)
*H01M 4/02* (2006.01)

(52) U.S. Cl.
CPC .... *H01M 50/204* (2021.01); *H01M 2004/027* (2013.01); *H01M 2004/028* (2013.01); *H01M 2220/20* (2013.01)

(56) References Cited

FOREIGN PATENT DOCUMENTS

| | | |
|---|---|---|
| JP | 2013-198270 A | 9/2013 |
| JP | 2017-191676 A | 10/2017 |

\* cited by examiner

BATTERY PACK, AND POWER CONSUMING DEVICE THEREOF

CROSS-REFERENCE TO RELATED APPLICATION

The present application is a continuation of International Application No. PCT/CN2021/131490, filed Nov. 18, 2021, which is incorporated herein by reference in its entirety.

TECHNICAL FIELD

The present application relates to the field of secondary batteries, and in particular relates to a battery pack and a power consuming device thereof.

BACKGROUND ART

Secondary batteries have become the most popular energy storage system due to the characteristics such as low costs, a long lifespan, and a good safety performance, and are now widely used in the fields of pure electric vehicles, hybrid electric vehicles, the smart grids, etc. A certain spatial arrangement of a plurality of lithium ion batteries results in a battery pack which can be directly used as a power supply for electric vehicles.

However, a common problem in electric vehicles today is the deterioration of power performance at low temperature, such as in winter. It is a technical problem that needs to be solved urgently to improve the discharge performance of a secondary battery at low temperature or in winter and improve the power performance of a traction battery at low temperature.

SUMMARY OF THE DISCLOSURE

In view of the above-mentioned problem, an objective of the present application is to provide a battery pack so as to solve the problem of a significantly reduced discharge power of a battery pack at low temperature or in winter.

In order to achieve the above objective, in a first aspect, the present application provides a battery pack comprising a first battery cell type and a second battery cell type, wherein the first battery cell type includes n first battery cells, and the second battery cell type includes m second battery cells, with n and m being each independently selected from an integer of 1 or more, wherein the second battery cell has a discharge power at −20° C. greater than that of the first battery cell, the difference in discharge power at −20° C. between the second battery cells and the first battery cells being ≥10 W;

the battery pack has diagonals Lc defined across length and width directions thereof, an area enclosed by connecting 4 points on the two diagonals Lc that are positioned at a distance of ¼ Lc from each of the endpoints of the diagonals with lines in sequence, is defined as area A, and the remaining area is defined as area B; the percentage by number of the first battery cells in the battery cells comprised in area A is 20% to 100%, and the percentage by number of the second battery cells in the battery cells comprised in the area B is 5% to 100%.

In the outer area of the battery pack, the use of battery cells having a higher discharge power than that of the battery cells in the inner area can improve the overall discharge power of the battery pack, while effectively improving the consistency of the discharge power in the inner area and the outer area, thus offsetting the discharge power difference of the battery cells in different areas resulting from inconsistent internal and external temperatures to a significant extent, and solving the problem that the overall discharge power of the battery pack drops significantly at low temperature or in winter. The percentage by number of the first battery cells in the battery cells comprised in the area A may further be 60% to 100%, optionally, 80%-100%. The percentage by number of the second battery cells in the battery cells comprised in the area B may further be 40% to 100%, optionally, 60%-100%.

In any embodiment, in the battery pack, the difference in the discharge power at −20° C. between the first battery cell and the second battery cell is ≥15 W, optionally, ≥20 W, and further optionally, no more than 30 W. In any embodiment, in the battery pack, the ratio of the discharge power at −20° C. of the second battery cell to the discharge power at −20° C. of the first battery cell is ≥1.1, and optionally, 1.2 to 1.5. The difference in the discharge power between the first battery cells and the second battery cells is increased, such that the consistency of the discharge power in the inner and outer areas of the battery pack can be further improved.

In any embodiment, the discharge power at −20° C. of the first battery cells is 120 W-145 W, and the discharge power at −20° C. of the second battery cells is 140 W-195 W. A combination of two types of battery cells that have a suitable discharge power range is selected, such that the effects resulting from a specific arrangement of the battery cells can be further improved.

In any embodiment, the second battery cells comprise at least one pseudocapacitance structure, and the first battery cells has a number of pseudocapacitance structures less than that in the second battery cells. Pseudocapacitance structures are provided in the second battery cells and the number of the pseudocapacitance structures therein is defined to be more than that in the first battery cells, such that it is conducive to further realizing different discharge powers of different battery cells. In some embodiments, the second battery cell comprises 3-10 the pseudocapacitance structures. Providing multiple layers of pseudocapacitance structure further improves the discharge power of the second battery cells at low temperature.

In any embodiment, the second battery cell comprises a positive electrode plate, a negative electrode plate and a separator arranged between the positive electrode plate and the negative electrode plate, and the pseudocapacitance structure is composed of the positive electrode plate, the negative electrode plate, and at least one layer of an activated carbon containing-coating provided between the positive electrode plate and the negative electrode plate. In some embodiments, the positive electrode plate comprises a positive electrode current collector and a positive electrode material layer provided on at least one surface of the positive electrode current collector, and the coating is provided on the surface of the positive electrode material layer at the side away from the positive electrode current collector. In some other embodiments, the coating is provided on the surface of the separator at the side facing the positive electrode plate. Providing at least one layer of an activated carbon coating is conducive to improving the discharge power of the second battery cell.

In any embodiment, the coating satisfies at least one of the following conditions:
  (1) the activated carbon has a specific surface area of 1000 m²/g-2000 m²/g, and/or the activated carbon has a pore volume of 0.5-0.9 mL/g;

(2) the activated carbon has a mass percentage of 80 wt %-90 wt %, based on the total weight of the coating;
(3) the coating has a thickness of 10 µm-30 µm; and
(4) the coating has a porosity of 20%-40%. The parameters for the activated carbon coating are selected and designed, such that the improvement of the pseudocapacitance structure on the discharge power of the battery cell can be adjusted.

In any embodiment, the positive electrode material layer of the first battery cell has a coating weight greater than that of the positive electrode material layer of the second battery cell; optionally, the ratio of the coating weight of the positive electrode material layer of the first battery cell to that of the positive electrode material layer of the second battery cell is 1.1-5; optionally, the positive electrode material layer of the first battery cell has a coating weight of 19 mg/cm$^2$-39 mg/cm$^2$, and the positive electrode material layer of the second battery cell has a coating weight of 5.2 mg/cm$^2$-21 mg/cm$^2$. The coating weight of the positive electrode material layer of the second battery cell is designed to be less than that of the positive electrode material layer of the first battery cell, such that the two types of batter cells can have obviously different discharge powers, so as to improve the overall low-temperature discharge power of the battery pack.

In any embodiment, in the area B, the battery cells at least at the four corners of the battery pack are all the second battery cells; optionally, in the area B, only the battery cells at the four corners of the battery pack are the second battery cells. Different battery cells are selectively placed in specific positions, such that a precise control over the overall discharge power of the battery pack can be achieved.

In a second aspect, the present application provides a power consuming device comprising a battery pack selected from a battery pack in the first aspect of the present application.

BRIEF DESCRIPTION OF THE DRAWINGS

In order to more clearly illustrate the technical solutions of the present application, brief introductions are given below to the drawings required to be used in the examples of the present application. Apparently, the drawings described below are merely some examples of the present application, and those of ordinary skill in the art may derive other drawings from these drawings without creative efforts.

LIST OF REFERENCE NUMERALS

Figure 1:
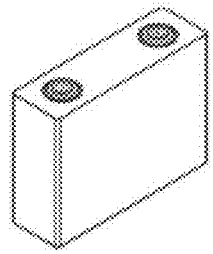
FIG. 1 is a schematic diagram of a lithium ion secondary battery in an embodiment of the present application.

1—battery pack
2—upper case body
3—lower case body
4—battery module
5—lithium ion secondary battery
51—housing
52—electrode assembly
53—cover plate

DETAILED DESCRIPTION OF EMBODIMENTS

For the sake of brevity, some numerical ranges are explicitly disclosed herein. However, any lower limit may be combined with any upper limit to form a range that is not explicitly described; and any lower limit may be combined with any other lower limit to form a range that is not explicitly specified, and any upper limit likewise may be combined with any other upper limit to form a range that is not explicitly specified. Furthermore, each individually disclosed point or single value itself may serve as a lower or upper limit in combination with any other point or single value or with other lower or upper limit to form an unspecified range.

The present applicants have found by research that: the deterioration of the power performance of a battery pack at low temperature is mainly influenced by two factors: (1) a low temperature in winter results in the increase in the overall internal resistance of the battery pack, thus resulting in an impossible instantaneous high-power discharge; and (2) since the temperature in winter is low and the thermal dissipation coefficients in various areas are different, the temperature distribution in different areas of the battery pack varies significantly and the discharge powers of the battery cells are inconsistent. For the first problem, thermal insulation measures for a battery pack can be improved such that the overall internal resistance of the battery cell can be reduced; nevertheless, regarding to the inconsistent discharge powers in the inner and outer areas resulting from different heat dissipation speeds in different areas of the battery pack, there is no effective solution at the battery pack packaging level now.

A variety of solutions regarding the design of the arrangement of battery cells in a battery pack have been present in the prior art, with an attempt to improve the relevant performance of the battery pack. For example, CN 213150897 U discloses a battery pack comprising a first battery assembly and a second battery assembly, wherein the first battery assembly includes several first battery cells stacked in sequence in the length direction, the second battery assembly includes several second battery cells stacked in sequence in the width direction, and the length of the first battery cell is greater than that of the second battery cell; and wherein the first battery assemblies and the second battery assemblies are alternately arranged in the length direction of the case body. Compared with the prior art, such battery pack is designed to arrange different battery cells in a mixed manner, which effectively improves the energy density of the battery pack, saves the production costs of the battery pack, and at the same time, improves the overall structural strength and safety performance of the battery pack. CN 112271341 A discloses a laminated battery cell and a lithium ion battery, wherein the laminated battery cell comprises a negative electrode plate, a separator and a positive electrode plate stacked successively, and at least one of the negative electrode plate and the positive electrode plate has a surface coated with a coating that can adsorb gases. In the present disclosure, the laminated battery cell is coated on the surface of at least one of the electrode plates with a coating that can absorb gases, such that for one thing, the gases generated by the battery cells of the lithium ion battery during the use and thermal runaway can be absorbed, thus improving the safety performance of the battery cell of the lithium ion battery; and for another, the gases generated during the formation of the lithium ion battery can be adsorbed by the coating, thus reducing the amount of the aluminum-plastic film airbag of the soft-pack battery used as well as the production costs of the battery cell.

However, none of the prior arts listed above involves the improvement in electric vehicles in terms of a reduced discharge power at low temperature or in winter, and solving the problem of an inconsistent discharge power in different areas of the battery pack at low temperature or in winter. Therefore, there is a need to improve the discharge power in different areas of the battery pack at low temperature or in winter.

In an embodiment of the present application, the present application provides a battery pack, with the intention to solve problems of a significantly decreased discharge power and poor consistency of the discharge power in different areas of the battery pack at low temperature or in winter.

In order to achieve the above objective, in a first aspect, the present application provides a battery pack comprising a first battery cell type and a second battery cell type,
wherein the first battery cell type includes n first battery cells, and the second battery cell type includes m second battery cells, with n and m being each independently selected from an integer of 1 or more,
wherein the second battery cell has a discharge power at −20° C. greater than that of the first battery cell, the difference in discharge power at −20° C. between the second battery cells and the first battery cells being ≥10 W;
the battery pack has diagonals Lc defined across length and width directions thereof, an area enclosed by connecting 4 points on the two diagonals Lc that are positioned at a distance of ¼ Lc from each of the endpoints of the diagonals with lines in sequence, is defined as area A, and the remaining area is defined as area B; the percentage by number of the first battery cells in the battery cells comprised in area A is 20% to 100%, and the percentage by number of the second battery cells in the battery cells comprised in the area B is 5% to 100%.

The battery pack of the present application is a square battery pack. The battery pack has a length La, a width Lb, and a diagonal Lc in a face with the length and width. On the surface defined by the length and width of the battery pack, the area enclosed by connecting 4 points on the two diagonals Lc, that are positioned at a distance of ¼ Lc from each of the endpoints of the diagonals with lines in sequence, is defined as area A, and the remaining area is defined as area B. The area A is located in a relatively inner part of the battery pack, and the battery cells contained in this area have at most one surface exposed to the external air, and most of the battery cells even have no surface exposed to the external atmosphere. The battery cells in the area A thus have a poor heat dissipation coefficient, which may result in a temperature increase of the battery cells after a period of working time. Comparatively, the area B is located in the outer part of the battery pack. The battery cells contained therein have a relatively large area in contact with the external atmosphere, and some may even have three surfaces in contact with the external atmosphere, such that the battery cells therein have a larger heat dissipation coefficient. After a certain period of working time, the temperature of the battery cells in the area B is relatively lower than that of the battery cells in the area A. at low temperature or in winter, the temperature difference of the battery cells in the inner and outer areas may lead to discharge power differences of batteries in different areas. For example, the battery cells in the relatively inner area A have the discharge power thereof well maintained due to a higher temperature; in contrast, the battery cells in the outer area B have the discharge power thereof significantly reduced over the working time due to a lower temperature. The reduced consistency of the discharge power in the inner and outer areas may results in a significant reduction of the overall discharge power of the battery pack, and even failing to work due to a too low discharge power of the outer battery.

In an embodiment of the present application, the battery pack comprises a first battery cell type and a second battery cell type, wherein the first battery cell type includes n first battery cells, and the second battery cell type includes m second battery cells, with n and m being each independently selected from an integer of 1 or more. Optionally, n and m are each independently selected from integers of 4, 8, 12 and even 16 or more. In an embodiment of the present application, at least one first battery cell and at least one second battery cell are electrically connected in series. The first battery cell and the second battery cell may be battery cells of different chemical systems. For example, the first battery cell and the second battery cell are enabled to be two types of battery cells with significant differences in electrochemical activity, by selecting different types of positive electrode active materials and negative electrode active materials, different electrolyte formulations, and different electrode plate structures, etc. For the present application, it is important to make the low-temperature discharge power of the second battery cell greater than that of the first battery cell, and the difference in the discharge power at −20° C. between the first battery cell and the second battery cell is ≥10 W. Since the discharge power at −20° C. of the second batter cell is at least 10 W greater than the discharge power at −20° C. of the first battery cell, the second battery cell, even at a relatively lower temperature, can have an equivalent or even higher discharge power than that of the first battery cell at a relatively higher temperature, or in other words, the two battery cells have no significant difference in the retention degree of discharge power at low temperature or in winter. The battery pack provided by the present application, by comprising first battery cells with a percentage by number of 20% to 100% in the area A as defined above and second battery cells with a percentage by number of 5% to 100% in the area B as defined above, successfully makes the difference in the discharge power (or the decrease of the discharge power) of battery cells in the inner and outer areas at low temperature or in winter is maintained at a relatively consistent level. Both of the area A and the area B may comprise a first battery cell and a second battery cell at the same time. Optionally, in the area A, the number of the first battery cells is greater than that of the second battery cell; in contrast, in the area B, the number of the second battery cells is greater than that of the first battery cell. In some embodiments, the percentage by number of the first battery cells in the battery cells comprised in the area A is 60% to 100%, optionally, 80%-100%. The percentage by number of the second battery cells in the battery cells comprised in the area B is 40% to 100%, optionally, 60%-100%. The battery pack provided by the present application, by adjusting the difference value of the discharge power of battery cells in different areas of the battery pack, appropriately compensates the discharge power difference resulting from the internal-external temperature difference at low temperature or in winter, reduces the influence of the temperature difference in different areas on the overall performance of the battery pack, and improves the consistency of the overall discharge power of the battery pack.

In some embodiments, the difference in the discharge power at −20° C. between the first battery cell and the second battery cell is ≥15 W, optionally, ≥20 W, and further optionally, no more than 30 W. In other embodiments, the ratio of the discharge power at −20° C. of the first battery cell to the discharge power at −20° C. of the second battery cell is ≥1.1, and optionally, 1.2 to 1.5. The difference in the discharge power at −20° C. between the first battery cell and the second battery cell is increased, which further compensates the difference in the discharge power of the two battery cells resulting from temperature difference.

In some embodiments, the discharge power at −20° C. of the first battery cells is 120 W-145 W, and the discharge power at −20° C. of the second battery cells is 140 W-195 W. The discharge power at −20° C. of the battery cells can be measured by the method described in the examples below. The discharge power of the battery cells is selected to be in a suitable range, such that the accurate control over the overall discharge power at low temperature of the battery pack can be achieved.

In some embodiments, both of the first battery cells and the second battery cells are lithium ion secondary batteries. The lithium ion secondary battery has a positive electrode plate, a negative electrode plate, a separator and an electrolyte, wherein the positive electrode plate comprises a positive electrode current collector and a positive electrode material layer provided on the at least surface of the positive electrode current collector, and the positive electrode material layer comprises a positive electrode active material and carbon. In some embodiments, the second battery cells comprise at least one pseudocapacitance structure, and the first battery cells has a number of pseudocapacitance structures less than that in the second battery cells. The second battery cell comprises a positive electrode plate, a negative electrode plate and a separator arranged between the positive electrode plate and the negative electrode plate, and the pseudocapacitance structure is composed of the positive electrode plate, the negative electrode plate, and at least one layer of an activated carbon containing-coating provided between the positive electrode plate and the negative electrode plate. The pseudocapacitance structure comprising an activated carbon coating can improve the discharge power of the battery cell. When the battery cell is discharged at a high rate, the impedance for lithium ions entering the positive electrode active coating is large; while the activated carbon coating has a large specific area, and can physically adsorb lithium ions quickly and act as a buffer, which allows the later intercalation of lithium ions into the positive electrode active coating.

The activated carbon coating should be provided between the positive electrode plate and the negative electrode plate. In some embodiments, the positive electrode plate comprises a positive electrode current collector and a positive electrode material layer provided on at least one surface of the positive electrode current collector, and the coating is provided on the surface of the positive electrode material layer at the side away from the positive electrode current collector. In some other embodiments, the coating is provided on the surface of the separator of the battery cell at the side facing the positive electrode plate. The batter cell of the present application can comprise a plurality of pseudocapacitance structures, where the activated carbon coating may be provided on the surface of the positive electrode material layer at the side away from the positive electrode current collector or on the surface of the separator at the side facing the positive electrode plate, or the two surfaces are both provided with coatings. In some embodiments, the second battery cell comprises 3-10 the pseudocapacitance structures, and optionally comprise 4-8 the pseudocapacitance structures. The first battery cells may comprise no pseudocapacitance structure, and can also comprise a plurality of the pseudocapacitance structures, provided that the number of the pseudocapacitance structures therein is less than that comprised in the second battery cells. This design allows that the discharge power at low temperature of the second battery cells is higher than that of the first battery cells. When the battery pack works at low temperature, the second battery cells can maintain a higher discharge power compared to the first battery cells, which reduces the inconsistency degree of the discharge power in different areas of the battery pack due to the internal-external temperature difference.

In some embodiments, the coating satisfies at least one of the following conditions:
(1) the activated carbon has a specific surface area of 1000 $m^2/g$-2000 $m^2/g$, and/or the activated carbon has a pore volume of 0.5-0.9 mL/g;
(2) the activated carbon has a mass percentage of 80 wt %-90 wt %, based on the total weight of the coating;
(3) the coating has a thickness of 10 μm-30 μm; and
(4) the coating has a porosity of 20%-40%.

The source of the activated carbon is not limited, and commercially available products may be selected and used. Since a large number of micropores are comprised on its surface, the activated carbon has a high specific surface area, is capable of adsorbing $Li^+$ relatively fast, and reduces the impedance to $Li^+$ migration. Optionally, the activated carbon has a specific surface area of 1100 $m^2/g$-1400 $m^2/g$. The activated carbon coating can be applied on the surface of the positive electrode material layer or the separator by any suitable method, for example, spray coating or scrape coating. A suitable activated carbon coating may be prepared by mixing an activated carbon powder, an organic solvent, and a binder and applying same on a substrate. A useful formulation is, for example, 80-90 weight % of activated carbon; 1-5 weight % of conductive carbon black (SP); 5-15 weight % of PVDF and 20-60 weight % of NMP. Exemplary activated carbon materials may have the following characteristic parameters:

| | | |
|---|---|---|
| Particle size (μm) | Dv10 | 1.9 |
| | Dv50 | 5.5 |
| | Dv90 | 10.2 |
| | Dv99 | 14.1 |
| | Dn10 | 0.47 |
| SSA ($m^2/g$) | | 1297 |

The design and adjustment of parameters for the coating in the pseudocapacitance structure and parameters for the activated carbon in the coating can accurately adjust the difference in the discharge power at low temperature of the second battery cells and the first battery cells, thus achieving the control over the overall discharge power of the battery pack.

Another measure to adjust the discharge power at low temperature of the battery cell is to design the coating weight of the positive electrode material layer in the battery cell. In some embodiments, the positive electrode material layer of the first battery cell has a coating weight greater than that of the positive electrode material layer of the second battery cell; optionally, the ratio of the coating weight of the positive electrode material layer of the first battery cell to that of the positive electrode material layer of the second battery cell is 1.1-5; optionally, the positive electrode material layer of the first battery cell has a coating weight of 19 mg/cm$^2$-39 mg/cm$^2$, and the positive electrode material layer of the second battery cell has a coating weight of 5.2 mg/cm$^2$-21 mg/cm$^2$. The positive electrode active material used in the positive electrode material layer of the battery cell of the present application may be any suitable material, and can be applied on the positive electrode current collector by a conventional method. Reducing the coating weight of the positive electrode material layer of the second battery cell comparing with that of the first battery cell enables a faster Li$^+$ migration, thus improving the instantaneous discharge power of the second battery cell. The weight ratio, and a specific range thereof, of the coating weight of the positive electrode material layer in the first battery cell to that in the second battery cell are selected, such that the difference in the discharge power at low temperature of the two types of battery cells can be more precisely adjusted, so as to improve the overall discharge power of the battery pack.

In the present application, the spatial arrangement of different battery cells in the battery pack can be further defined, such that an accurate control over the discharge performance of the battery pack can be achieved. In some embodiments, in the area B of the battery pack, the battery cells at least at the four corners are all the second battery cells; optionally, in the area B, only the battery cells at the four corners of the battery pack are the second battery cells. Since the batter cells at the four corners of the battery pack have at least three surfaces in contact with the external atmosphere, the thermal dissipation coefficients thereof are the highest among those of all battery cells in the battery pack. Arranging second battery cells with a higher discharge power at low temperature at these positions further balance the difference in the discharge power due to different temperatures in the inner and outer areas.

As stated above, the discharge power of the battery pack significantly decreases at low temperature. In the battery pack of the present application, since a larger number of second battery cells with a higher discharge power are used in the outer area B comparing with the area A, the consistency of the overall discharge power of the battery pack is improved, with a relatively small loss of the discharge power of battery cells in the outer area, and therefore the loss of the overall discharge power of the battery pack at low temperature is also smaller than that of the battery pack of the prior art.

The battery cells comprised in the battery pack will be illustrated in more detail below. In some embodiments, both of the first battery cells and the second battery cells are lithium ion secondary batteries.

Generally, a lithium ion secondary battery comprises a positive electrode plate, a negative electrode plate, a separator and an electrolyte. During the charge/discharge process of the battery, active ions are intercalated and de-intercalated back and forth between the positive electrode plate and the negative electrode plate. The separator is provided between the positive electrode plate and the negative electrode plate, and functions for separation. The electrolyte is located between the positive electrode plate and the negative electrode plate and functions for ionic conduction.

[Electrolyte]

The electrolyte is located between the positive electrode plate and the negative electrode plate and functions for conducting ions. The electrolyte comprises an electrolyte salt and a solvent.

In the present application, the electrolyte salts are those commonly used in the lithium ion secondary batteries, for example, a lithium salt, including the above lithium salt of formula (3). As an example, the electrolyte salt may be selected from more than one of LiPF$_6$ (lithium hexafluorophosphate), LiBF$_4$ (lithium tetrafluoroborate), LiAsF$_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiPO$_2$F$_2$ (lithium difluorophosphate), LiDFOP (lithium bisoxalatodifluorophosphate), LiSO$_3$F (lithium fluorosulfonate), NDFOP (difluorobisoxalate), Li$_2$F(SO$_2$N)$_2$SO$_2$F, KFSI, CsFSI, Ba(FSI)$_2$ and LiFSO$_2$NSO$_2$CH$_2$CH$_2$CF$_3$. In some embodiments, the electrolyte salt comprises LiPF$_6$.

The type of the solvent is not particularly limited, and may be selected according to actual needs. In some embodiments, the solvent is a non-aqueous solvent. Optionally, the solvent may include one or more of chain carbonates, cyclic carbonates, and carboxylates. In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetrahydrofuran, sulfolane (SF), dimethyl sulfone (MSM), ethyl methyl sulfone (EMS) and diethyl sulfone (ESE). In view of good thermal stability and electrochemical stability at a high temperature and a high voltage, optionally, the solvent may include, in addition to dimethyl carbonate, one ore more of selected from diethyl carbonate, dipropyl carbonate, ethyl methyl carbonate, methyl propyl carbonate, ethylene carbonate, propylene carbonate, butylene carbonate, ethyl propyl carbonate, 1,4-butyrolactone, methyl formate, ethyl acetate, propyl acetate, methyl propionate, ethyl propionate, methyl propionate, and tetrahydrofuran, thereby providing a stable electrochemical environment for high-nickel lithium ion batteries at 4 V or above. Optionally, the mass percentage of the non-aqueous solvent in the electrolyte is 65%-85%.

In some embodiments, the electrolyte further optionally comprises other additives. For example, the additive can include a negative electrode film-forming additive, a positive electrode film-forming additive, and also an additive that can improve certain performance of the battery, such as an additive that improve the overcharge performance of the battery, an additive that improve the high temperature performance of the battery, and an additive that improve the low temperature performance of the battery. As an example, the additives may be selected from at least one of cyclic carbonate compounds containing an unsaturated bond, halogen substituted cyclic carbonate compounds, sulfate compounds, sulfite compounds, sultone compounds, disulfonic acid compounds, nitrile compounds, aromatic compounds, isocyanate compounds, phosphonitrile compounds, cyclic anhydride compounds, phosphite compounds, phosphate compounds, borate compounds, and carboxylate compounds.

[Positive Electrode Plate]

The positive electrode plate comprises a positive electrode current collector and a positive electrode material layer provided on at least one surface of the positive electrode current collector, and the positive electrode material layer comprises a positive electrode active material and carbon.

As an example, the positive electrode current collector has two surfaces opposite in its own thickness direction, and the positive electrode material layer is provided on either or both of the two opposite surfaces of the positive electrode current collector.

In the lithium ion secondary battery of the present application, the positive electrode current collector may be a metal foil or a composite current collector. For example, as a metal foil, an aluminum foil may be used. The composite current collector may comprise a polymer material substrate and a metal layer formed on at least one surface of the polymer material substrate. The composite current collector may be formed by forming a metal material (e.g., aluminum, aluminum alloys, nickel, nickel alloys, titanium, titanium alloys, silver and silver alloys, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode active material may comprise a first positive electrode active material represented by formula (I) and a second positive electrode active material represented by formula (II):

$$LiFe_{1-x1}M^1_{x1}PO_4 \qquad \text{formula (I)}$$

$$LiFe_{1-x2}M^2_{x2}PO_4 \qquad \text{formula (II)}$$

where $0 \le x1 \le 0.1$, $0 < x2 \le 0.1$, $M^1$ and $M^2$ are each independently selected from one or more of Cu, Mn, Cr, Zn, Pb, Ca, Co, Ni, Sr and Ti, and $M^2$ at least includes Mn.

In some other embodiments, the positive electrode active material may comprise a third positive electrode active material represented by formula (III) and a fourth positive electrode active material represented by formula (IV):

$$Li_{1+x3}Ni_aCo_bM^3_{1-a-b}O_{2-y3}A_{y3} \qquad \text{formula (III)}$$

$$Li_{1+x4}Mn_eM^4_{2-e}O_{4-d}B_d \qquad \text{formula (IV)}$$

where in formula (III), $-0.1 \le x3 \le 0.2$, $0.3 \le a < 0.95$, $0 < b < 0.2$, $0 < a+b < 1$, $0 \le y3 < 0.2$, $M^3$ is selected from one or more of Mn, Fe, Cr, Ti, Zn, V, Al, Zr and Ce, and A is selected from one or more of S, F, Cl and I; in formula (IV), $-0.1 \le x4 \le 0.2$, $0 < e \le 2$, $0 \le d < 1$, $M^4$ is one or more of Ni, Fe, Cr, Ti, Zn, V, Al, Mg, Zr and Ce, and B is one or more of S, N, F, Cl, Br and I.

In addition to the above materials of formulas (I)-(IV), the positive electrode active material may also include other material selected from one or more of lithium transition metal oxides, lithium-containing phosphates with an olivine structure, and respective modified compounds thereof. Optionally, the positive electrode active materials of formulas (I)-(IV) are 60-100 weight %, and optionally 80-100 weight % of the total weight of the positive electrode active materials. An example of the lithium transition metal oxide may include, but is not limited to, one or more of lithium cobalt oxides, lithium nickel oxides, lithium manganese oxides, lithium nickel cobalt oxides, lithium manganese cobalt oxides, lithium nickel manganese oxides, lithium nickel cobalt manganese oxides, lithium nickel cobalt aluminum oxides and the respective modified compounds thereof. An example of the lithium-containing phosphates with an olivine structure may include, but is not limited to, one or more of lithium iron phosphate, a lithium iron phosphate-carbon composite, lithium manganese phosphate, a lithium manganese phosphate-carbon composite, lithium iron manganese phosphate, a lithium iron manganese phosphate-carbon composite and modified compounds thereof. These materials are all commercially available. A surface of the positive electrode active substance may be coated with carbon.

The positive electrode material layer optionally comprises a conductive agent. However, the type of the conductive agent is not limited specifically, and can be selected by those skilled in the art according to actual requirements. As an example, the conductive agent for the positive electrode material may be selected from more than one of Super P, superconductive carbon, acetylene black, carbon black, ketjenblack, carbon dots, carbon nanotubes, graphene, and carbon nanofibers.

The positive electrode material layer optionally also comprises a binder. As an example, the binder may be one or more of a styrene-butadiene rubber (SBR), a water-based acrylic resin, polyvinylidene fluoride (PVDF), polytetrafluoroethylene (PTFE), an ethylene-vinyl acetate copolymer (EVA), polyacrylic acid (PAA), carboxymethyl cellulose (CMC), polyvinyl alcohol (PVA) and polyvinyl butyral (PVB).

In the present application, the positive electrode plate can be prepared according to a method known in the art. As an example, a positive electrode active material, a conductive agent and a binder can be dispersed into a solvent (e.g., N-methylpyrrolidone (NMP)) to form a uniform positive electrode slurry; and the positive electrode slurry is coated onto a positive electrode current collector, and is then subjected to procedures such as drying and cold pressing, so as to obtain the positive electrode slurry.

[Negative Electrode Plate]

A negative electrode plate comprises a negative electrode current collector and a negative electrode material layer provided on at least one surface of the negative electrode current collector, wherein the negative electrode material layer comprises a negative electrode active material.

As an example, the negative electrode current collector has two surfaces opposite in its own thickness direction, and the negative electrode material layer is provided on either or both of the two opposite surfaces of the negative electrode current collector.

In the lithium ion secondary battery of the present application, the negative electrode current collector may be a metal foil or a composite current collector. For example, as a metal foil, a copper foil may be used. The composite current collector may comprise a polymer material substrate and a metal layer formed on at least one surface of the polymer material substrate. The composite current collector can be formed by forming a metal material (e.g., copper, copper alloys, nickel, nickel alloys, titanium, titanium alloys, silver and silver alloys, etc.) on a polymer material substrate (such as polypropylene (PP), polyethylene terephthalate (PET), polybutylene terephthalate (PBT), polystyrene (PS), polyethylene (PE), etc.).

In the lithium ion secondary battery of the present application, the negative electrode material layer generally comprises a negative electrode active material and an optional binder, an optional conductive agent and other optional auxiliary agents, and is generally formed by coating a negative electrode slurry, followed by drying. The negative electrode slurry is generally formed by dispersing a negative electrode active material, and an optional conductive agent and a binder etc., into a solvent and uniformly stirring same. The solvent may be N-methylpyrrolidone (NMP) or deionized water.

The specific types of the negative electrode active materials are not limited, and active materials known in the art that can be used for the negative electrode of lithium ion secondary batteries can be used, and the active materials can be selected by a person skilled in the art according to actual requirements. As an example, the negative electrode active material may be selected one or more of natural graphite, artificial graphite, mesophase carbon micro beads (abbreviated as MCMB), hard carbon, soft carbon, silicon, a silicon-carbon composite, an Li—Sn alloy, an Li—Sn—O alloy, Sn, SnO, $SnO_2$, lithiation $TiO_2$—$Li_4Ti_5O_{12}$ with a spinel structure, and an Li—Al alloy.

As an example, the conductive agent may be selected from one or more of Super P, superconductive carbon, acetylene black, carbon black, ketjenblack, carbon dots, carbon nanotubes, graphene, and carbon nanofibers.

As an example, the binder may be selected from more than one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

The other optional auxiliary agents are, for example, a thickening agent (for example, sodium carboxymethyl cellulose, CMC-Na), etc.

[Separator]

The lithium ion secondary battery using an electrolyte further comprise a separator. The separator is provided between the positive electrode plate and the negative electrode plate, and functions for separation. The type of the separator is not particularly limited in the present application, and any well known porous-structure separator with good chemical stability and mechanical stability may be selected. In some embodiments, the material of the separator can be selected from at least one of glass fibers, non-woven fabrics, polyethylene, polypropylene and polyvinylidene fluoride. The separator may be a single-layer film and also a multi-layer composite film, and is not limited particularly. When the separator is a multi-layer composite film, the materials in the respective layers may be same or different, which is not limited particularly.

In some embodiments, the positive electrode plate, the negative electrode plate and the separator can be manufactured into an electrode assembly by means of a winding process or a lamination process.

In some embodiments, the lithium ion secondary battery may comprise an outer package. The outer package can be used to package the electrode assembly and electrolyte as described above.

In some embodiments, the outer package of the lithium ion secondary battery may be a hard housing, for example, a hard plastic housing, an aluminum housing, a steel housing, etc. The outer package of the lithium ion secondary battery may also be a soft bag, for example, a pouch-type soft bag. The material of the soft package may be plastics, and the examples of plastics may include polypropylene (PP), polybutylene terephthalate (PBT), and polybutylene succinate (PBS), etc.

The shape of the lithium ion secondary battery is not particularly limited in the present application, and may be a cylindrical shape, a square shape or any other shape. For example, FIG. 1 is a lithium ion secondary battery 5 of a square structure as an example.

Figure 2:
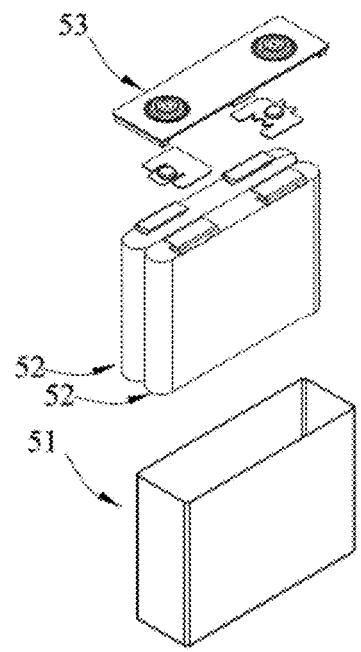
FIG. 2 is an exploded view of the lithium ion secondary battery shown in FIG. 1 in an embodiment of the present application.

In some embodiments, referring to FIG. 2, the outer package may include a housing 51 and a cover plate 53, wherein the housing 51 may include a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can be subjected to a winding process or a lamination process to form an electrode assembly 52. The electrode assembly 52 is encapsulated in the accommodating cavity. The electrolyte infiltrates the electrode assembly 52. The number of the electrode assembly 52 contained in the lithium ion secondary battery 5 may be one or more, which can be selected by a person skilled in the art according to specifically actual requirements.

In some embodiments, the lithium ion secondary batteries can be assembled into a battery module 4, and the number of the lithium ion secondary batteries contained in the battery module 4 may be one or more, and the specific number can be selected by those skilled in the art according to the application and capacity of the battery module 4. In the battery module 4, a plurality of lithium ion secondary batteries 5 may be arranged sequentially in the length direction of the battery module. Apparently, the secondary batteries can also be disposed in any other manner. Further, the plurality of lithium ion secondary batteries 5 may be fixed with fasteners. Optionally, the battery module 4 may further comprise a housing with an accommodating space, and a plurality of lithium ion secondary batteries 5 are accommodated in the accommodating space.

In some embodiments, the above lithium ion secondary batteries 5 or the battery modules 4 can be assembled into a battery pack 1, and the number of the lithium ion secondary batteries 5 or the battery modules 4 contained in the battery pack 1 can be selected by those skilled in the art according to the application and capacity of the battery pack 1.

Figure 3:
FIG. 3 is a schematic diagram of a battery pack in an embodiment of the present application.
Figure 4:
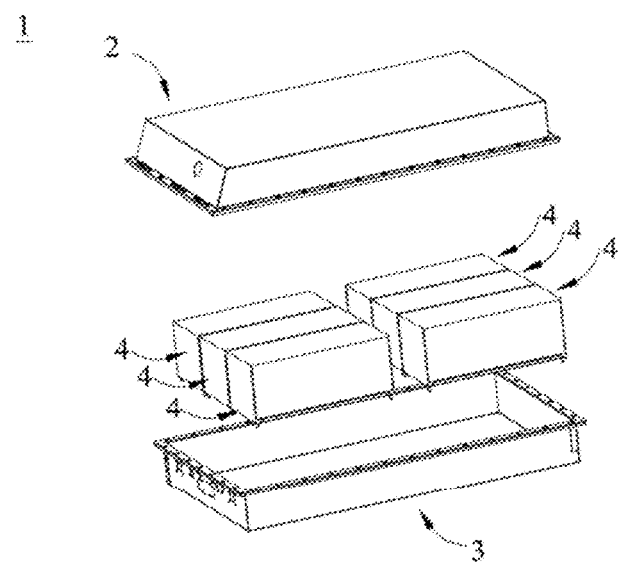
FIG. 4 is an exploded view of the battery pack shown in FIG. 3 in an embodiment of the present application.

FIG. 3 and FIG. 4 show a battery pack 1 as an example. Referring to FIGS. 3 and 4, the battery pack 1 may comprise a battery case and a plurality of battery cells arranged in the battery case. The battery case comprises an upper case body 2 and a lower case body 3, wherein the upper case body 2 can cover the lower case body 3 to form a closed space for accommodating the battery cells.

Figure 5:
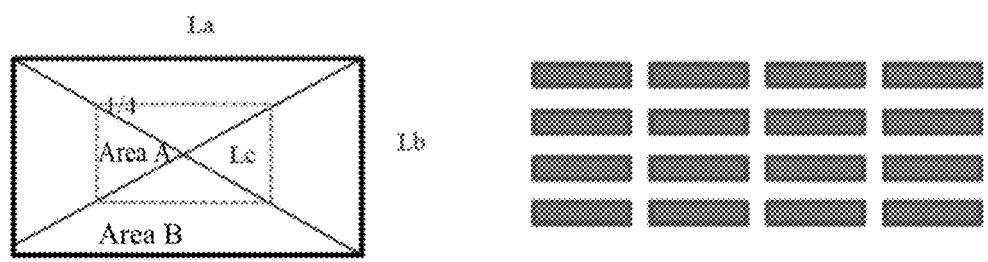
FIG. 5 is a schematic diagram of the area division and the arrangement of battery cells in the battery pack shown in FIG. 3 in an embodiment of the present application.

FIG. 5 is a schematic diagram of the area division and the arrangement of battery cells of a battery pack in an embodiment of the present application. In the figure, the area enclosed by connecting 4 points on the two diagonals Lc across length and width directions thereof, that are positioned at a distance of ¼ Lc from each of the endpoints of the diagonals with lines in sequence, is defined as area A, and the remaining area is defined as area B. The battery cells are placed in respective areas according to the type and percentage by number described in the present application, thus adjusting the discharge power in different areas.

In addition, the present application further provides a device comprising the battery pack provided by the present application. The battery pack may be used as a power supply of the device, or an energy storage unit of the device. The device may be, but is not limited to, a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like.

For the device, the battery packs can be selected according to the usage requirements thereof.

Figure 6:
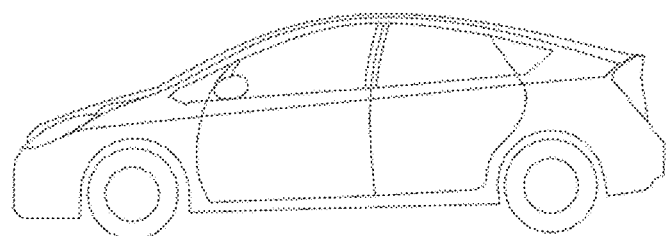
FIG. 6 is a schematic diagram of a device with a battery pack in an embodiment of the present application as a power supply.

FIG. 6 shows a device as an example. The device may be a pure electric vehicle, a hybrid electric vehicle, a plug-in hybrid electric vehicle, etc. In order to meet the requirements of the device for a high power and a high energy density of a lithium ion secondary battery, a battery pack or a battery module can be used.

EXAMPLES

Hereinafter, the examples of the present application will be explained. The examples described below are exemplary and are merely for explaining the present application, and should not be construed as limiting the present application. The techniques or conditions that are not specified in examples are according to the techniques or conditions described in documents in the art or the product introduction. The reagents or instruments used, if they are not marked with the manufacturer, are common products that are commercially available.

1. Preparation of Battery Cells (1) Preparation of Positive Electrode Plate

Carbon-coated lithium iron phosphate (LFP) as a positive electrode active material, a conductive agent of acetylene black, a binder of polyvinylidene fluoride (PVDF) are dissolved at a weight ratio of 96:2:2 into a solvent of N-methylpyrrolidone (NMP), and fully stirred and mixed to obtain a positive electrode slurry. The positive electrode slurry is uniformly coated onto an aluminum positive electrode current collector, followed by drying, cold pressing and slitting to obtain a positive electrode plate. For the first battery cells, the coating weight of the active material of the positive electrode material layer is selected as shown in table 1. For the second battery cells, the coating weight of the active material of the positive electrode material layer is selected as shown in table 2, and the surface of the positive electrode material layer at the side away from the positive electrode current collector is coated with an activated carbon coating by the method below: a certain amount of a slurry containing 87 weight % of activated carbon (with a specific surface area of 1297 m$^2$/g, YP-50F from Kuraray, Japan), 3 weight % of SP, 10 weight % of PVDF and 20 weight % of NMP is coated onto the positive electrode material layer of a second battery cell, and then dried to obtain the coating. A single coating has a thickness of 15 μm and a porosity of 30%. The number of the pseudocapacitance structures of the second battery cells are designed as shown in Table 2, that is repeating required times of the method as described above to obtain the required number of pseudocapacitance structures.

(2) Preparation of Negative Electrode Plate

A negative active material of synthetic graphite, a conductive agent of acetylene black, a binder of butadiene styrene rubber (SBR) and a thickening agent of sodium carboxymethyl cellulose (CMC-Na) are dissolved at a weight ratio of 95:2:2:1 into a solvent of deionized water, and uniformly mixed to prepare a negative electrode slurry. The negative electrode slurry is uniformly coated onto a negative electrode current collector of a copper foil, dried and then subjected to cold pressing and slitting to obtain the negative electrode plate.

(3) Preparation of Electrolyte

In a glove box under an argon atmosphere (H$_2$O<0.1 ppm, O$_2$<0.1 ppm), organic solvents of ethylene carbonate (EC), dimethyl carbonate (DMC), and ethyl methyl carbonate (EMC) are uniformly mixed at a weight ratio of 2:5:3, lithium hexafluorophosphate (LiPF$_6$) is added and adjusted to a concentration of 1 M/L, and the mixture is uniformly stirred to obtain a corresponding electrolyte.

(4) Preparation of Lithium Ion Secondary Battery

The above positive electrode plate prepared in (1) and the above negative electrode plate prepared in (2) are used, and a polypropylene film is used as a separator; the positive electrode plate, the separator and the negative electrode plate are stacked in sequence, such that the separator is located between the positive electrode plate and the negative electrode plate to functions for isolation, followed by winding obtain an electrode assembly. The electrode assembly is placed in a battery housing, dried, and then the electrolyte is injected, followed by formation and leaving to stand to obtain a lithium ion secondary battery as a battery cell.

2. Packaging of the Battery Pack

The first battery cells and second battery cells having a different coating weight of the positive electrode material layer and different number of pseudocapacitance structures prepared as stated above are placed according to the number and areas shown in table 3, so as to obtain the batty packs with different battery cell arrangement. The assembled battery pack in an embodiment of the present application merely comprises the first battery cells and the second battery cells prepared as stated above, in which, the total number of all battery cells in the area A is 48, and that of all battery cells in the area B is 72.

3. Discharge Power Test:

The capacity of the battery cell or the battery pack is adjusted to 30% SOC: At an environment of 25° C., a lithium ion battery is charged and discharged at a constant rate of ⅓ C (1 C=the rated capacity of a battery cell), with a charge/discharge voltage range of 2.8-3.65 V, the step is repeated three times, and the third discharge capacity obtained is recorded as the nominal capacity C0 of the battery cell; the battery is started to be charged at ⅓ C0 rate to ⅓ of the nominal capacity, and the SOC state of the battery cell is adjusted to 30% SOC;

Discharge power test of battery or battery pack: At an environment of −20° C., the above battery cell is discharged with I=0.36 C0 for 30 s, the voltage values before and after charging are recorded as V0 and V1 respectively, and (V0−V1)/0.36 C0 is recorded as the internal resistance value R of the battery; thus the discharge power of the battery is P=I$^2$*R.

The battery pack prepared in each example is subjected to a discharge power test, and the test results are shown in table 3.

TABLE 1

Corresponding parameters and tested discharge power of fist battery cells A1-A3

| | Number of pseudocapacitance structure | Coating weight of positive electrode material layer (g/1540.25 mm$^2$) | −20° C., 0.36 C, DC, 30 s Discharge power (W) |
|---|---|---|---|
| Battery cell A1 | 0 | 0.312 | 140.7 |
| Battery cell A2 | 0 | 0.405 | 135.6 |
| Battery cell A3 | 0 | 0.512 | 130.8 |

TABLE 2

Corresponding parameters and tested discharge power of second battery cells B1-B10

| | Number of pseudocapacitance structure | Coating weight of positive electrode material layer (g/1540.25 mm²) | −20° C., 0.36 C, DC, 30 s Discharge power (W) |
|---|---|---|---|
| Battery cell B1 | 0 | 0.105 | 150.5 |
| Battery cell B2 | 1 | 0.307 | 145.2 |
| Battery cell B3 | 1 | 0.210 | 150.8 |
| Battery cell B4 | 1 | 0.105 | 160.7 |
| Battery cell B5 | 5 | 0.307 | 165.2 |
| Battery cell B6 | 5 | 0.210 | 170.4 |
| Battery cell B7 | 5 | 0.105 | 175.6 |
| Battery cell B8 | 10 | 0.307 | 180.4 |
| Battery cell B9 | 10 | 0.210 | 185.3 |
| Battery cell B10 | 10 | 0.105 | 190.2 |

TABLE 3

Discharge power test results of battery packs of examples 1-7 and comparative examples 1-2

| Example no. | Area A | | | Area B | | | Discharge power ratio of first battery cells to second battery cells | Overall discharge power of battery pack (W) |
|---|---|---|---|---|---|---|---|---|
| | Type of battery cells in area A | Number of first battery cells in area A | Discharge power of single first battery cell (W) | Type of battery cells in area B | Number of second battery cells in area B | Discharge power of single second battery cell (W) | | |
| Example 1 | A1 | All | 138.2-142.1 | B5 | 4 | 162.3-167.2 | 90% | 12204 |
| Example 2 | A1 | All | 138.2-142.1 | B5 | 8 | 162.3-167.2 | 90% | 12882 |
| Example 3 | A1 | All | 138.2-142.1 | B5 | 16 | 162.3-167.2 | 90% | 13560 |
| Example 4 | A1 | All | 138.2-142.1 | B5 | 48 | 162.3-167.2 | 90% | 15216 |
| Example 5 | A1 | All | 138.2-142.1 | B5 | All | 162.3-167.2 | 90% | 15500 |
| Example 6 | A1 | All | 138.2-142.1 | B8 | 16 | 178.1-183.2 | 82% | 14160 |
| Example 7 | A1 | All | 138.2-142.1 | B10 | 16 | 188.3-193.2 | 73% | 14960 |
| Comparative example 1 | B5 | All | 162.3-167.2 | A1 | All | 138.2-142.1 | 90% | 15020 |
| Comparative example 2 | A1 | All | 138.2-142.1 | A1 | All | 138.2-142.1 | — | 11960 |

It can be seen from Table 1 that for first battery cells, in a case where the number of the pseudocapacitance structures therein remains 0, their discharge power at −20° C. decreases with the increase of the coating weight of the positive electrode material layer.

Same is also applied to the second batter cells, see Table 2. It can be seen from Table 2 that for the second battery cells, in a case where the number of the pseudocapacitance structure therein remains constant (e.g., 1 or 5), their discharge power at −20° C. decreases with the increase of the coating weight of the positive electrode material layer. Likewise, in a case where the coating weight of the positive electrode material layer remains the same, the discharge power at −20° C. of the second battery cells increases with the increase of the number of the pseudocapacitance structure therein. In general, since the coating weight of the positive electrode material layer of the second battery cells is lower than that of the first battery cells and the number of the pseudocapacitance structure in the second battery cells is larger than that in the first battery cells, the discharge power value at −20° C. of the second battery cells is obviously higher than the discharge power value at −20° C. of the first battery cells.

It can be seen from the experimental data shown in Table 3 that, when all battery cells in area A are first battery cells, the overall discharge power of the battery pack rises with the increase of the number (and the percentage by number) of the second battery cells in area B. In a case where the number and layout of each type of battery cells in the battery pack are substantially the same, the higher the discharge power at −20° C. of the second battery cells is, the higher the overall discharge power of the batter pack will be.

In comparative example 1, the number of the first battery cells in area A is 0, and that of the second battery cells in area B is 0, which means that all the batter cells in the area B are first battery cells, and those in the area A are all second battery cells. A comparison is given between comparative example 1 and example 5, in which the battery cells of the battery packs are arranged in completely opposite positions. The test results regarding the discharge power at −20° C. of the two battery packs show that the battery pack of example 5 has an overall discharge power at −20° C. significantly higher than that of comparative example 1. Comparing comparative example 1 with example 4, both of them have the same number of first battery cells and second battery cells, the difference lies in that all second battery cells in comparative example 1 are placed in area A (a relatively inner area), while those in example 4 are all in area B (a relatively outer area). The results show that the discharge power at −20° C. of the battery pack of example 4 is obviously higher than the discharge power at −20° C. of the battery pack of comparative example 1. It demonstrates that even with the same number of battery cells of the same type, there are still significant differences in the discharge power of battery packs at low temperature due to different spatial arrangements.

In comparative example 2, the number of the second battery cells in area B is 0, which means that all battery cells in area B are first battery cells, namely, the battery cells in the battery pack of comparative example 2 are all first battery cells. The discharge power at −20° C. of the battery pack at the moment is only 11960 W, which is the lowest discharge power at −20° C. among that of all battery packs prepared in the examples of the present application.

On the basis of the experimental data in Table 1 to Table 3, it can be seen that compared to that of the prior art, the batter pack prepared by the present application has significantly improved low-temperature discharge power under the same conditions.

Although the present application is described with reference to the examples, various improvements may be made thereto, and the components thereof may be replaced with equivalents, without departing from the scope of the present application. In particular, the technical features mentioned in the embodiments can be combined in any manner as long as there is no structural conflict. The present application is not limited to specific embodiments disclosed herein, but includes all technical solutions that fall within the scope of the claims.

The invention claimed is:

1. A battery pack, comprising a first battery cell type and a second battery cell type,
    wherein the first battery cell type includes n first battery cells, and the second battery cell type includes m second battery cells, with n and m being each independently selected from an integer of 1 or more,
    wherein the second battery cell has a discharge power at −20° C. greater than that of the first battery cell, the difference in discharge power at −20° C. between the second battery cells and the first battery cells being ≥10 W;
    the battery pack has diagonals Lc defined across length and width directions thereof, an area enclosed by connecting 4 points on the two diagonals Lc that are positioned at a distance of ¼ Lc from each of the endpoints of the diagonals with lines in sequence, is defined as area A, and the remaining area is defined as area B; the percentage by number of the first battery cells in the battery cells comprised in area A is 20% to 100%, and the percentage by number of the second battery cells in the battery cells comprised in the area B is 5% to 100%,
    wherein the second battery cell comprise at least one pseudocapacitance structure, and the first battery cell has a number of pseudocapacitance structures less than that in the second battery cell, and
    wherein the second battery cell comprises a positive electrode plate, a negative electrode plate and a separator arranged between the positive electrode plate and the negative electrode plate, and the pseudocapacitance structure is composed of the positive electrode plate, the negative electrode plate, and at least one layer of an activated carbon-containing coating provided between the positive electrode plate and the negative electrode plate.

2. The battery pack according to claim 1, wherein the difference in discharge power at −20° C. between the second battery cells and the first battery cells is ≥15 W.

3. The battery pack according to claim 1, wherein the ratio of the discharge power at −20° C. of the second battery cell to the discharge power at −20° C. of the first battery cell is ≥1.1.

4. The battery pack according to claim 1, wherein the first battery cell has a discharge power at −20° C. of 120 W-145 W, and the second battery cell has a discharge power at −20° C. of 140 W-195 W.

5. The battery pack according to claim 1, wherein the positive electrode plate comprises a positive electrode current collector and a positive electrode material layer provided on at least one surface of the positive electrode current collector, and the coating is provided on the surface of the positive electrode material layer at the side away from the positive electrode current collector.

6. The battery pack according to claim 1, wherein the coating is provided on the surface of the separator at the side facing the positive electrode plate.

7. The battery pack according to claim 1, wherein the coating at least satisfies one of the following conditions:
    (1) the activated carbon has a specific surface area of 1000 m²/g-2000 m²/g;
    (2) the activated carbon has a mass percentage of 80 wt %-90 wt %, based on the total weight of the coating;
    (3) the coating has a thickness of 10 μm-30 μm; and
    (4) the coating has a porosity of 20%-40%.

8. The battery pack according to claim 1, wherein the second battery cells comprise 3-10 the pseudocapacitance structures.

9. The battery pack according to claim 1, wherein the positive electrode material layer of the first battery cell has a coating weight greater than that of the positive electrode material layer of the second battery cell;
    optionally, the ratio of the coating weight of the positive electrode material layer of the first battery cell to that of the positive electrode material layer of the second battery cell is 1.1-5;
    optionally, the positive electrode material layer of the first battery cell has a coating weight of 19 mg/cm²-39 mg/cm², and the positive electrode material layer of the second battery cell has a coating weight of 5.2 mg/cm²-21 mg/cm².

10. The battery pack according to claim 1, wherein the percentage by number of the first battery cells in the battery cells comprised in the area A is 60% to 100%.

11. The battery pack according to claim 1, wherein the percentage by number of the second battery cells in the battery cells comprised in the area B is 40% to 100%.

12. The battery pack according to claim 1, wherein in the area B, the battery cells at least at the four corners of the battery pack are all the second battery cells; optionally, in the area B, only the battery cells at the four corners of the battery pack are the second battery cells.

13. A power consuming device, comprising a battery pack according to claim 1.

14. The battery pack according to claim 1, wherein the percentage by number of the first battery cells in the battery cells comprised in area A is 60% to 100%, and the percentage by number of the second battery cells in the battery cells comprised in the area B is 40% to 100%.

15. The battery pack according to claim 14, wherein the percentage by number of the second battery cells in the battery cells comprised in the area B is 60% to 100%.

* * * * *